P. P. HARING.
COTTON PICKING MACHINE.
APPLICATION FILED FEB. 26, 1908. RENEWED OCT. 20, 1910.

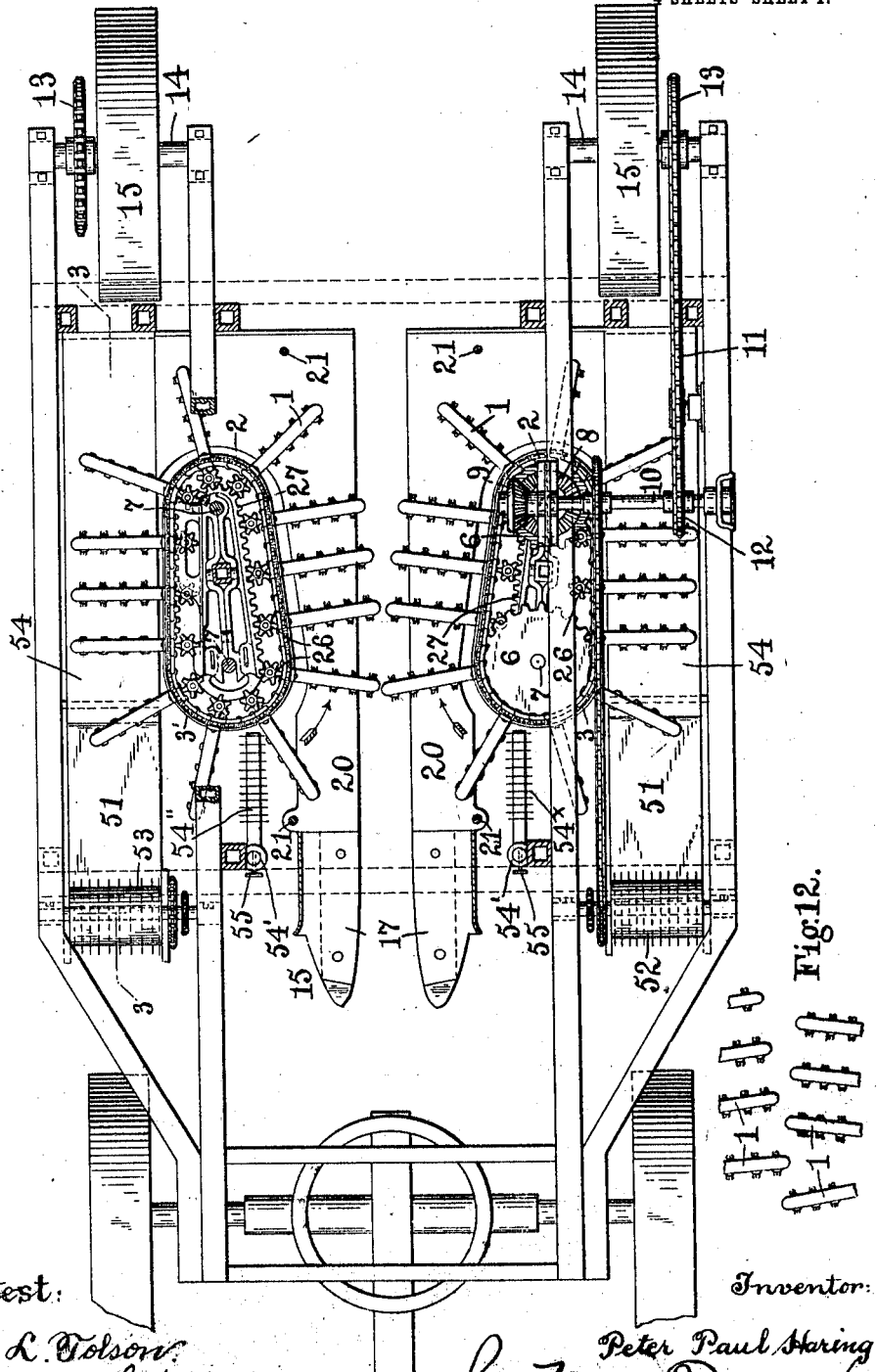

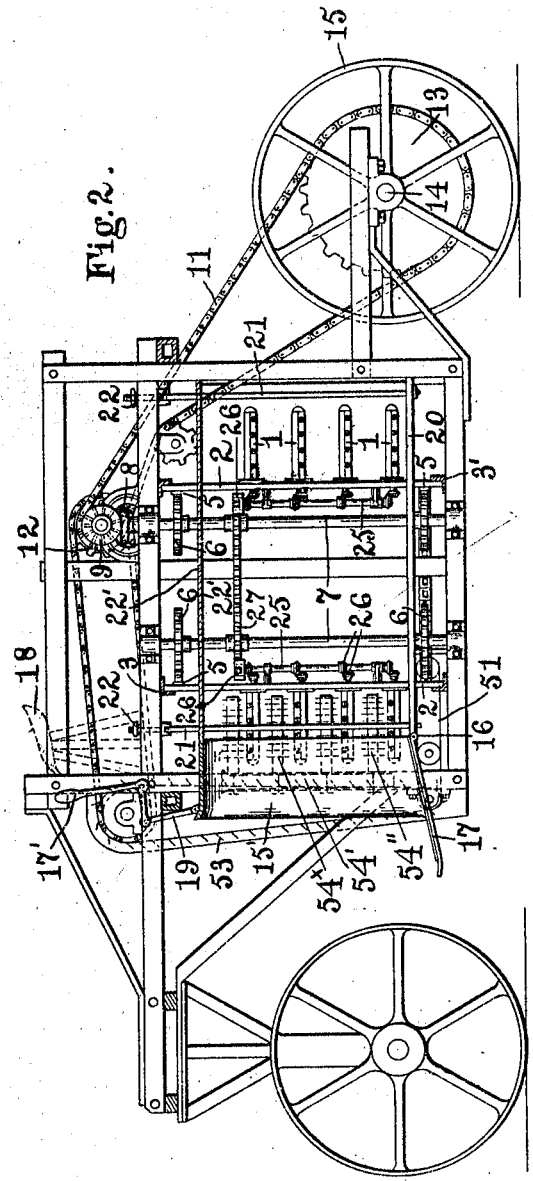
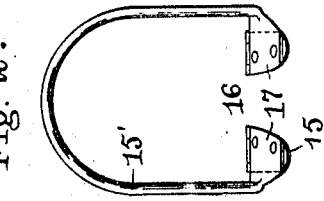

992,960.

Patented May 23, 1911.

4 SHEETS—SHEET 3.

Attest:
Edward L. Tolson.
Edward N. Sarton.

Inventor:
Peter Paul Haring
By Spear, Middleton, Donaldson & Spear
Attys.

P. P. HARING.
COTTON PICKING MACHINE.
APPLICATION FILED FEB. 26, 1908. RENEWED OCT. 20, 1910.
992,960.
Patented May 23, 1911.
4 SHEETS—SHEET 4.
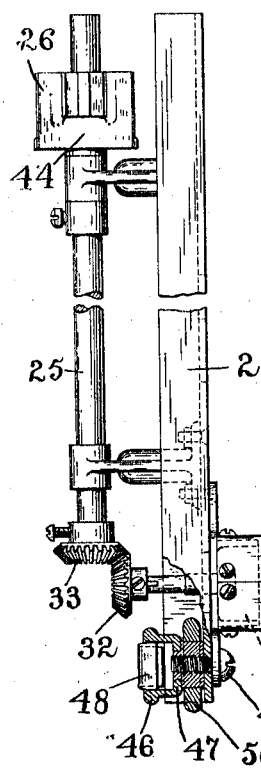
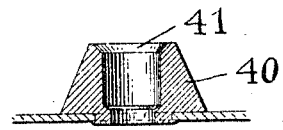
Fig. 8.
Fig. 9.
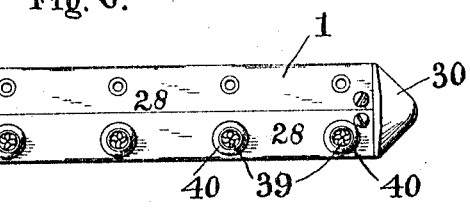
Fig. 6.
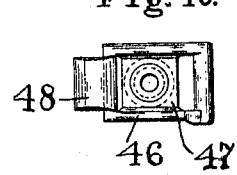
Fig. 10.
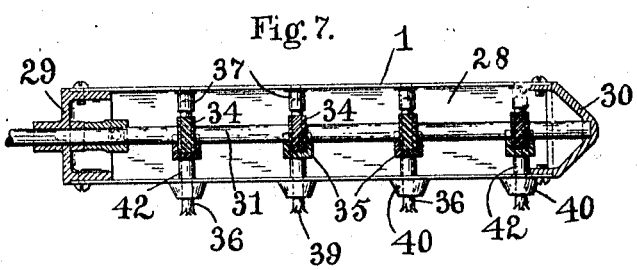
Fig. 7.
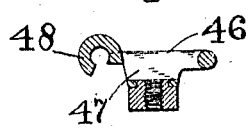
Fig. 11.
Attest:
Ewd L. Tolson
Edward N. Sarton
Inventor:
Peter Paul Haring,
By Spear, Middleton, Donaldson & Spear
Att'ys

UNITED STATES PATENT OFFICE.

PETER PAUL HARING, OF GOLIAD, TEXAS.

COTTON-PICKING MACHINE.

992,960.     Specification of Letters Patent.     Patented May 23, 1911.

Application filed February 26, 1908, Serial No. 417,986. Renewed October 20, 1910. Serial No. 588,184.

*To all whom it may concern:*

Be it known that I, PETER PAUL HARING, a citizen of the United States, residing at Goliad, Texas, have invented certain new and useful Improvements in Cotton-Picking Machines, of which the following is a specification.

My invention relates to cotton picking machines of the general class disclosed in Letters Patent of the United States granted to me, and particularly that numbered 796,421 of Aug. 8, 1905.

My present improvements are designed to increase the capacity of the machine and to render its operation more certain, and particularly I have improved the means whereby the cotton is released from the picker fingers when it has arrived at the proper point of delivery. I have also improved the machine in respect to bringing all portions of the plant into contact with the picker arms, and I have provided an oiling device to lubricate the picker fingers and spindles in order to better free the said fingers and spindles from the cotton when the delivery point is reached.

The invention consists in the features and combination and arrangement of parts hereinafter described and particularly pointed out in the claims.

Figure 4:
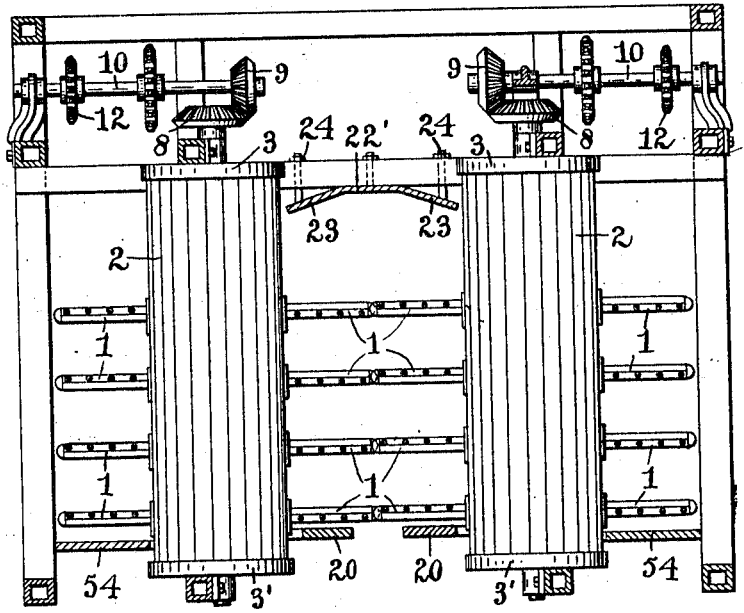
Figure 5:
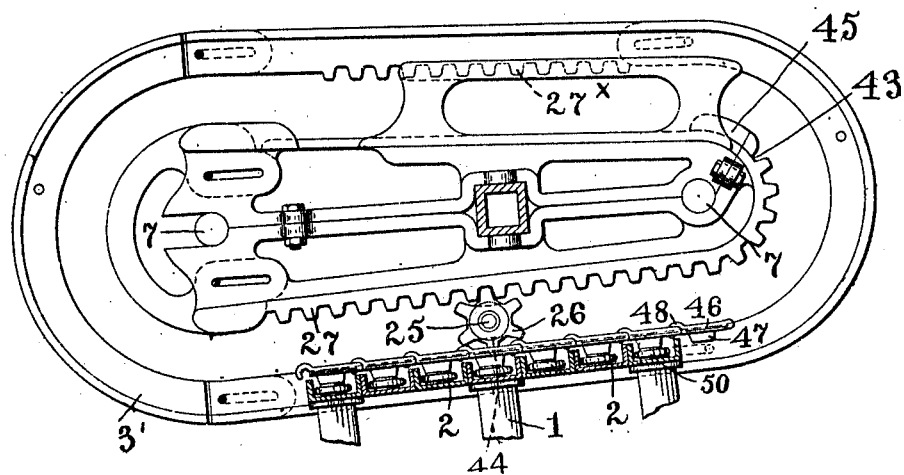

In the accompanying drawings, Figure 1 is a plan view of the machine embodying my improvements, parts being in section. Fig. 2 is a longitudinal sectional view through the apparatus. Fig. 2ª is a detailed view of the hood looking from the front of the machine. Fig. 2ᵇ is a detail view of the oiling device. Fig. 3 is a sectional view substantially on the line 3—3 of Fig. 1. Fig. 4 is a cross sectional view of a part of the machine. Fig. 5 is a detailed plan view of the track along which the series of picker carrying staves travel showing the means for operating the picker spindles and for giving the reverse movement thereto in releasing the cotton therefrom. Fig. 6 is a detailed view of one of the picker staves with one of the picker arms associated therewith. Fig. 7 is a detail view showing a longitudinal section of the picker arm with the picker spindles and the operating mechanism therefor arranged in the said arm. Fig. 8 is a detailed view of one of the projecting cones, which are associated with the picker spindle. Fig. 9 is a detail face view of a picker. Figs. 10 and 11 are detail views of one of the links. Fig. 12 is a detail view showing the preferred relations between the picker arms in which those on one carrier are interspaced in position relatively to those on the other carrier.

The general form of machine is the same as that disclosed in the patent above described, the picker arms being shown at 1 carried by a traveling series of staves or supports 2, one of said series being located on each side of the longitudinal central line of the machine, so that the picker arms will extend from one series of traveling staves partly across the space between it and the other series of staves, in which space the cotton plant is received as the machine passes along. The endless bands of slats or staves travel in a frame work comprising tracks 3—3' receiving the upper and lower ends of the said staves or slats. These tracks are of substantially elliptical form, as shown in Fig. 1, the major axis of the elliptical formation being slightly inclined to the longitudinal axis of the machine. The endless band or series of slats or staves are driven as in the patent above described, through chains 5 connected thereto, the links of which are engaged by sprocket wheels 6, arranged on vertical shafts 7 journaled in the frame work of the machine.

One of the shafts 7 has a bevel gear 8 at its upper end and with this meshes a bevel gear 9 on a horizontal shaft 10 to which power is applied through the chain 11 passing over a sprocket wheel 12 on the shaft 10 and over a sprocket wheel 13 on the shaft 14 of a traction wheel 15 so that as the machine is drawn along by the horses attached thereto, the endless chains carrying the series of slats or staves will be caused to travel and thus move the picker arms in among the plants and across the same to take the cotton therefrom. It will be understood of course that each of the endless bands or series of staves is driven in a manner similar to that just described.

In order to direct the plants to the space between the two series of picker arms, I provide near the front of the machine a hood 15', which is pivotally supported at 16 so that its front portion may be raised and lowered. This hood is of arched shape at the top and each of its depending sides is provided with substantially horizontally extending flanges at 17, each flange, however inclining downwardly toward the front in respect to the top of the hood. These flanges are curved outwardly at their front ends thus presenting a flaring opening or space between them in which the lower part or trunks of the plants are received and as this hood can be raised or lowered on its pivot point, it can be set to suit the size of the plant, and thus lift the lower branches thereof upwardly into the plane of the lowermost set of picker arms on the picker carrying staves or slats, it being understood that each one of these slats has a number of picker arms disposed thereon, one above the other as shown in Figs. 2 and 4. The hood may be adjusted vertically by tipping on its pivot 16, for which purpose a hand lever 17' is arranged near the seat 18 of the driver, said lever being connected by a link 19 with the hood so that by operating this lever the hood may be tilted on its pivot to raise or lower the front ends of the lifting or directing flanges 17 of said hood.

At the rear of the hood plates or bands 20 are arranged, forming practically continuations of the lifting or guiding flanges 17, and these continuations 20 extend just below the lower picker arm so that any cotton which may fall from the picker fingers as the picker arms are traveling toward the rear will lodge upon these guiding or directing plates and be swept rearwardly by the picker arms and carried to the point where the releasing action herein described is performed. These bands or plates 20 serve further however to hold the branches which have been caught by the directing flanges 17 of the hood up in the plane of movement of the picker arms, so that these lower branches will be acted upon by the picker fingers carried by the said arms. The plates 20 of course have a space between their inner edges to receive the stalks of the plants.

For supporting the directing plates 20 I provide hangers 21 extending down from the frame work, said hangers being held at their upper ends by any suitable means, such as nuts 22 and by which the said hangers may be adjusted to fix the plates in the desired position. The arrangement is such that the plates 20 being suspended by the hangers 21 are permitted slight lateral adjustment or movement due to the slight inherent flexible nature of the hangers so that no damage to the stalks of the plants will result if the machine is not driven accurately to make the stalks of the plants pass exactly centrally of the machine. In case the directing and lifting flanges 17 should strike the side of the plant, the hood, together with the directing plates 20 will be free to have slight yielding movement laterally to allow the machine to pass by this plant without damage thereto for it will be noticed the flexible hangers also support the hood, though indirectly.

The hood 15' has its upper portion flaring outwardly toward the front and this will contact with the upper portions of the plants and direct or bend them downwardly so as to be in the plane of operation of the picker arms, and for this purpose also I provide a top plate 22', Fig. 4, supported from the frame-work of the machine and forming substantially a continuation of the top of the hood, so that the tops of the plants will be held down or bent over at their upper ends throughout the length of the machine, or throughout the length of travel of the picker arms from the front to rear so as to be acted upon thereby. The top plate 22' it will be noticed has inclined side portions 23, the purpose of which is to direct the upper portions of the plants to the central line of the machine, and said plate is supported by any suitable form of hangers as at 24.

As in the machine described in my former patent, the picker spindles carried by the picker arms are rotated from vertically extending shafts 25 carried by the slats or staves of the picker carrier, and as disclosed in said patent this shaft was operated through gears 26 thereon meshing with fixed racks 27, supported by the frame work. These racks in the present case are inclined outwardly toward the rear in respect to the longitudinal axis of the machine, as shown in Fig. 5, and the endless carrier or chain for the slats or staves is caused to move in a direction inclined to the longitudinal axis of the machine and outwardly toward the rear, for which purpose the tracks 3 incline outwardly toward the rear. This arrangement will cause the picker arms to have not only a traveling movement from front to rear of the plant receiving space, but also a movement laterally and outwardly and in respect to the center of the machine so that these picker arms will be drawn through the plants or across the plants in the direction transversely to the line of travel of the machine, and thus the picker arms will be brought against larger areas of the plants than would otherwise be the case.

Referring now to the means for operating the picker spindles and the arrangement of said spindles it will be seen from Fig. 7 that the picker arms are formed of two plates 28, each of rectangular channel form, screwed to the bracket or boss 29, which is fixed to the slat or stave, the channel portions of said plates 28 facing each other and their outer ends being screwed to the head block 30. Each of these picker arms is similarly constructed and arranged and it is sufficient to describe the construction of one of them. Each arm has a shaft 31 extending longitudinally thereof bearing at one end in the head block 30 and at its other end in the bracket 29. Each shaft has a beveled gear 32 thereon meshing with a bevel gear 33 on the vertically extending shaft carried by the stave or slat. This picker arm shaft carries spiral gears 34 meshing with rotary drivers for the picker spindles consisting of spiral gears 35 on the picker spindles 36. These spindles are journaled in the walls of the picker arm and have longitudinal movement therethrough. Bosses or elongated bearings are provided on the interior of the picker arms at 37 to afford bearings for these picker spindles. These spindles carry the spiral gears 35 meshing with the spiral gears of the shaft 31. The picker spindles are formed at their ends with picker fingers 39 of substantially the same form as those disclosed in the patent above referred to, said fingers being curved and spreading out from each other at their outer end. These fingers work in conjunction with cones 40 extending outwardly from the outer sides of the picker arms and through which cones the picker spindles pass. The cones have a recess formed therein to receive the picker fingers when retracted, the said recess ending in a beveled edge at 41. The longitudinal movement of the picker spindles in the picker arms is limited in one direction by the spiral gears abutting against the bearing collars 37, and in the other direction by the sleeves 42 on said spindles abutting against the inner wall of the picker arm.

It will be clear from the above arrangement that supposing all of the picker spindles to be retracted and the picker fingers lying concealed or shielded by the cones, rotary movement of the shaft 31 carrying the spiral gears will cause the picker spindles to be thrust outwardly, provided said rotary movement is in the proper direction to effect this, and at the same time the picker spindles will be set in rotation and when projected they will thus be operating to grasp the cotton and take it from the plants. The picker spindles, together with the picker fingers will be held projected as long as the revolution of the parts continues in the direction just mentioned and during this time the picker fingers are twisting into the cotton and detaching the same from the plant. As in the patent above referred to, the rack 27 for imparting movement to the picker spindles is not continuous, but ends at the point 43, so that when the slats or staves carrying the picker arms now being described arrives at this point, the rotary movement of the picker spindles will cease, as they have at this time performed their function while in contact with the plants and have been carried around by the operation of the endless carrier to a point where they are withdrawn from the plant but are still holding the detached cotton which now must be released from the picker fingers. As soon as the carrier moves the gear wheel 26 past the point 43 the said gear wheel, together with all connections leading to the picker spindles are locked in position by a cam 44 on the shaft 25 engaging with a cam surface 45 supported on the frame of the machine in any suitable manner. This will hold the parts against movement until the point is reached at which the cotton is to be discharged from the picker finger, and this discharge is effected by giving a reverse rotary movement to the picker spindles from that which they have just had in taking the cotton from the plants. This reverse movement is effected by a rack 27× arranged to engage the gear 26 and give it a reverse movement from that which it formerly had and the rack 27× is located therefore on the outer side of the pathway traversed by the gear 26 and adjacent the point at which the cotton is to be discharged from the picker arm. The gear 26 therefore as soon as it is unlocked by passing the cam 45, engages the rack 27× and gives a reverse rotary movement to the shaft 25 and to the shaft in the picker arm, and this reverse movement is imparted to the picker spindles and at the same time these picker spindles which have remained projected are retracted within the picker arms by reason of the use of the spiral gears as a power transmitting means. This retracting movement of the picker spindles causes the picker fingers to recede within their cones and the picker fingers are so curved or inclined that this reverse movement will draw them from the cotton and release the said cotton so that it may fall from the picker arms. After having released the cotton the continued movement of the carrier moves the picker arm around to the front of the machine and into the space between the traveling carriers, at which point the gear 26 again meshes with the rack 27 and the operation above described is repeated, namely, the picker spindles are set in rotation and at the same time are projected from the recesses in the cones and the direction of rotation is such as to twist into the cotton and extract the same from the plant.

The links of the chain are of special formation consisting of the main frame or link portion 46 with a depressed transverse portion 47 connecting the sides of the link and with the hook or eye member 48 extending from one end of the link to engage the cross bar of the adjacent link. The depressed central cross bar of the link is secured to the stave or slat by a screw 49, a sleeve or collar surrounding the said screw and affording a bearing for the depressed cross bar or the link, and on this sleeve I arrange a roller 50 to roll in the track 3 of the frame and render the movement of the carrier easier to perform. This roller is located in the channeled side of the stave or slat and projects slightly below the lower end of the same. By the use of this form of link I am enabled to arrange the picker arms nearer to the ground or end of the stave than has heretofore been the case. The cotton as it falls from the picker arms is taken by a belt 51 and conveyed toward the front of the machine where it is taken by points projecting from an elevator belt 53, which carries it up for delivery at any suitable point. These belts are substantially the same in arrangement and operation as those described in my former patent. In rear of the horizontally extending belt I arrange a platform or plate 54, which provides in effect an extension of the plate 20 to receive any cotton which may fall from the picker arms so that the lowermost arm will sweep it forwardly on to the horizontal belt which conveys it to the elevator.

I have provided an oiling device for the picker spindles and fingers to supply thereto a limited amount of oil in order to facilitate the releasing of the cotton therefrom and to keep the points of the picker fingers free from lint or any gummy substances during their operation. These lubricating devices consist of reservoirs in the form of vertically extending tubes 54' supported on the frame work of the machine and having tubes 54'' extending laterally therefrom, and in between the planes in which the picker arms move, these tubes being perforated and provided with brushes 54ˣ so that the oil may pass through these tubes to saturate the brushes and the oil will be retained by these brushes and applied to the picker fingers as said fingers sweep past the brushes. Regulating screws are employed at 55 by which the supply of oil is regulated.

In turning the machine at the end of the row the hood may be raised by the driver.

Of course it will be understood that the cones 40 play an important part in releasing the cotton from the picker fingers as these picker points or fingers receding into the cone, force the cotton therefrom, the said cotton finding a bearing against the edge of the cone.

I claim as my invention:

1. In combination in a cotton picking machine, a series of traveling picker arms arranged on each side of the longitudinal center of the machine, and means at the front for directing the cotton plants to the plane of movement of said picker arms, said means having yielding movement laterally of the machine, substantially as described.

2. In combination with the movable picker arms arranged on each side of the center line of the machine, the upwardly and rearwardly inclined flanges at the front arranged with a space between them to lift the branches of the plants to the plane of the picker arms, said flanges being supported to have yielding movement laterally of the machine, substantially as described.

3. In combination with the picker arms disposed on each side of the center line of the machine, the plates arranged below the said picker arms and on each side of the center of the machine with a space between them for the passage of the plants, said plates having yielding movement laterally of the machine, substantially as described.

4. In combination with the series of picker arms arranged on each side of the center of the machine, the plates extending horizontally below the picker arm and on each side of the center, and the adjustable flanges at the front end of said plates to raise the branches of the plants to the plane of the picker arms, substantially as described.

5. In combination with the picker arms arranged with a passage between them, the hood pivotally mounted at the front of the machine for directing the plants to the picker arms, and means for adjusting the hood substantially as described.

6. In combination in a cotton picking machine, a picker, a picker arm a cone or bearing on the outer side thereof through which the said picker operates having a recess to receive the picker, and means for driving and advancing and retracting the picker, and for reversing the motion of the same, said reversing action and retracting movement of the picker causing the discharge of the cotton therefrom, substantially as described.

7. In combination in a cotton picking machine, a picker spindle having picker fingers, a cone having a recess to receive the picker fingers, means for carrying the picker spindle and cone, means for rotating the picker spindle and for advancing and retracting the same in relation to the cone, and to make the picker fingers recede within the recess of the cone, and means for reversing the rotary motion of the picker spindle, substantially as described.

8. In combination in a cotton picking machine, a picker arm, a carrier therefor, a picker spindle, picker fingers on the said spindle, a drive shaft for the picker spindle, spiral gearing between said picker spindle and the drive shaft, and means for reversing the movement of the said drive shaft, said picker spindle having a sliding movement in the picker arm, said sliding movement being effected by the spiral gearing when the rotary motion of the drive shaft is reversed, and means whereby the picker fingers are shielded when retracted, substantially as described.

9. In combination with the slats of the carrier, a chain composed of links each having a depressed cross bar, a bolt or screw for attaching said cross bar to the slat or stave and a roller interposed between the link and the stave, substantially as described.

10. In combination in a cotton picking machine, a picker arm of hollow form and rectangular in cross section, a shaft extending along the interior of the arm, a series of picker spindles extending transversely of the shaft above and below the same, and spiral gearing between the said shaft and the picker spindles, substantially as described.

11. In combination in a cotton picking machine, a picker having fingers and having advancing and retracting movement, bearings in which said picker is adapted to slide in advancing and retracting spiral gearing for rotating said picker and means for reversing the rotary movement of the gearing whereby the picker will be reversed in rotation and will be advanced or retracted as the case may be, substantially as described.

12. In combination in a cotton picking machine, pickers having fingers, carrier means for the pickers, upward and rearward inclined guide plates at the front of the machine pivotally mounted, and means for adjusting said plates, substantially as described.

13. In combination a picker arm, a picker spindle movable outwardly and inwardly in respect thereto, and having picker fingers thereon, and a rotary driver for the picker spindle with means for reversing the said driver, said driver moving the spindle outwardly as it rotates one way, and retracting the spindle as it rotates the other way, substantially as described.

In testimony whereof, I affix my signature in presence of two witnesses.

PETER PAUL HARING.

Witnesses:
L. J. LUTENBACHER,
J. C. BURNS.